(12) United States Patent
Noda

(10) Patent No.: US 9,578,206 B2
(45) Date of Patent: Feb. 21, 2017

(54) IMAGE FORMING APPARATUS AND IMAGE FORMING METHOD HAVE PRINT FUNCTION TO PREVENT SEE-THROUGH

(71) Applicant: KYOCERA Document Solutions Inc., Osaka (JP)

(72) Inventor: Tatsuo Noda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/925,218

(22) Filed: Oct. 28, 2015

(65) Prior Publication Data

US 2016/0119505 A1    Apr. 28, 2016

(30) Foreign Application Priority Data

Oct. 28, 2014    (JP) ................... 2014-219101

(51) Int. Cl.
*G06K 9/74* (2006.01)
*H04N 1/409* (2006.01)

(52) U.S. Cl.
CPC ................. *H04N 1/4095* (2013.01)

(58) Field of Classification Search
CPC ............... H04N 1/4493; H04N 1/3872
See application file for complete search history.

(56) References Cited

U.S. PATENT DOCUMENTS

| | | | | |
|---|---|---|---|---|
| 2005/0156946 A1* | 7/2005 | Nakano | ................. | G06F 3/0481 345/619 |
| 2008/0181703 A1* | 7/2008 | Ito | ......................... | B41J 3/4075 400/61 |
| 2009/0110290 A1* | 4/2009 | Nishimachi | .......... | G03G 21/046 382/195 |
| 2009/0262402 A1* | 10/2009 | Fan | ..................... | H04N 1/4095 358/488 |

FOREIGN PATENT DOCUMENTS

FOREIGN PATENT DOCUMENTS

FOREIGN PATENT DOCUMENTS

| | | |
|---|---|---|
| JP | 2001-171264 A | 6/2001 |
| JP | 2009-105843 A | 5/2009 |
| JP | 2009-182850 A | 8/2009 |
| JP | 2014-195286 A | 10/2014 |

* cited by examiner

*Primary Examiner* — Benny Q Tieu
*Assistant Examiner* — Haris Sabah
(74) *Attorney, Agent, or Firm* — Hawaii Patent Services; Nathaniel K. Fedde; Kenton N. Fedde

(57) ABSTRACT

Provided is an image forming apparatus that can keep the character of a concealing area secret certainly even if it makes low the printing rate of a see-through preventive image. A concealing area specifying part specifies the concealing area that includes a concealing character string in the print data. A character discriminating part discriminates character attribute of the concealing character string. A see-through preventive image generation part sets the see-through preventing area where shape and a size are the same as the concealing area. Also, see-through preventive image generation part generates a see-through preventive image where multiple characters having the character attribute discriminated by the character discriminating part are generated at random. A printing part prints the see-through preventive image in the position piled up by the same direction for the concealing area at the time of enclosure.

4 Claims, 9 Drawing Sheets

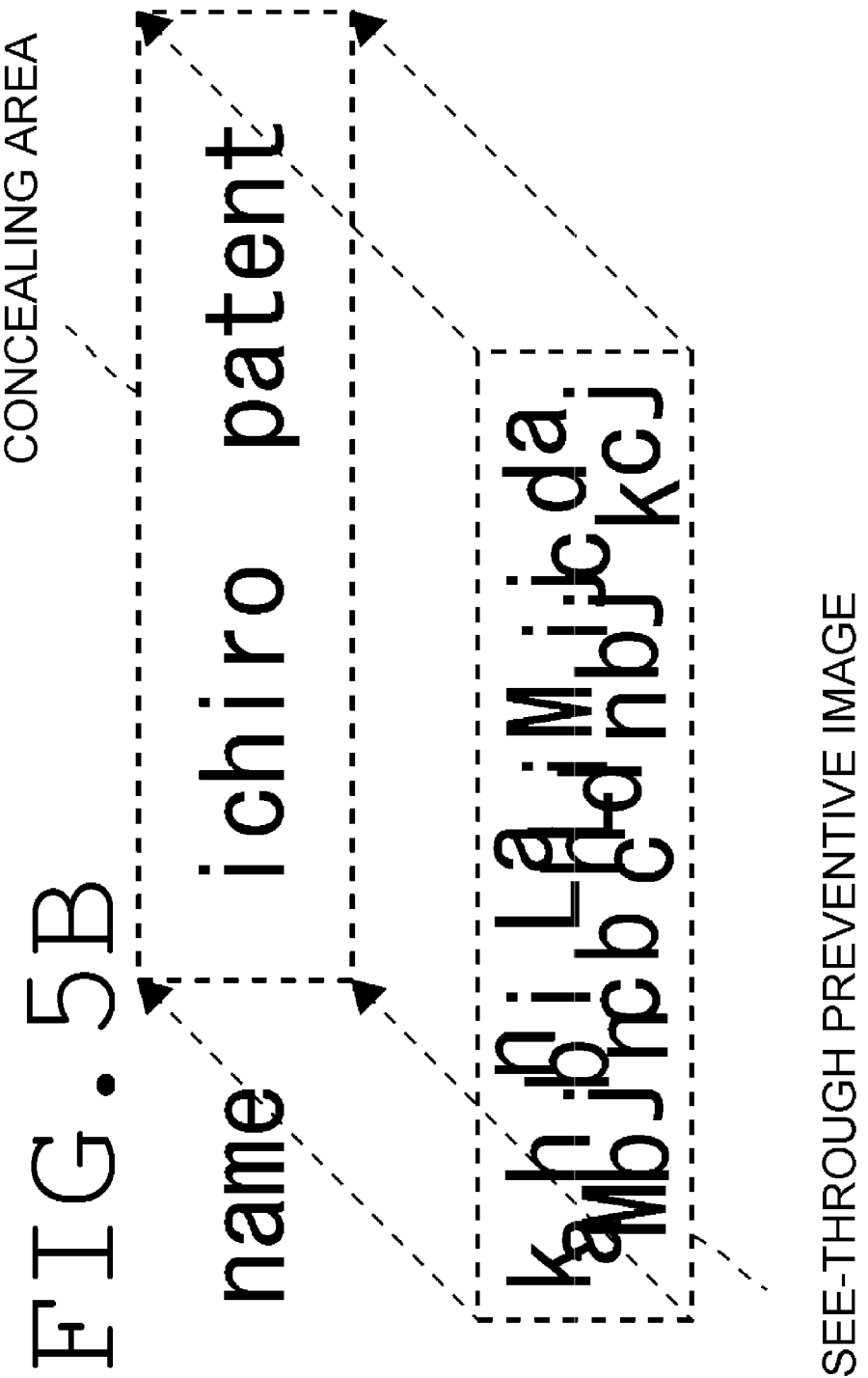

name

FIG. 5C

IMAGE FORMING APPARATUS AND IMAGE FORMING METHOD HAVE PRINT FUNCTION TO PREVENT SEE-THROUGH

INCORPORATION BY REFERENCE

This application is based on and claims the benefit of priority from Japanese Patent Application No. 2014-219101 filed on Oct. 28, 2014, the contents of which are hereby incorporated by reference.

BACKGROUND

The present disclosure is related with an image forming apparatus and an image forming method that has function to perform printing for preventing a see-through to aback surface of a recording paper.

When enclosing an envelope the recording paper with which printing is performed by an image forming apparatus, such as an MFP (Multifunction Peripheral) and a copying machine, printing matter performed to the recording paper may be looked through from outside of the envelope. In order to prevent this see-through, a technology is proposed that specifies a concealing area from the read image data and prints a see-through preventive image that prevents the see-through on the back surface of a concealing area or on the surface of the recording paper piled up with the concealing area at the time of enclosure.

SUMMARY

An image forming apparatus of the present disclosure is an image forming apparatus that prints print data on a recording paper and includes a concealing area specifying part, a character discriminating part, a see-through preventive image generation part, and a printing part. The concealing area specifying part specifies a concealing area that includes a concealing character string in the print data. The character discriminating part discriminates a character attribute of the concealing character string. The see-through preventive image generation part set a see-through preventing area where shape and a size are the same with the concealing area. Also, see-through preventive image generation part generate a see-through preventive image where multiple characters of the character attribute discriminated by the character discriminating part are generated at random and has arranged two or more generated characters at the random position in the see-through preventing area, respectively. The printing part generates the print data for see-through preventing that have arranged the see-through preventive image at the position piled up in the same direction for the concealing area at the time of enclosure and prints them on the recording paper.

An image forming apparatus of the present disclosure is an image forming apparatus that reads an image data formed on a manuscript as print data and prints the read print data on a recording paper. The image forming apparatus includes a concealing area specifying part, a character image cutting part, a memory part, a see-through preventive image generation part, and a printing part. The concealing area specifying part specifies a concealing area in the print data. The character image cutting part cuts down a character image as an every single character from the print data. The memory part reserves character image storage area and stores the character image cut down by the character image cutting part. The see-through preventive image generation part sets a see-through preventing area where shape and a size are the same with the concealing area and generates the see-through preventive image that arranges the character image stored in the character image storage area at the random position in the see-through preventing area, respectively. The printing part generates the print data for see-through preventing that arranges the see-through preventive image at a position piled up by the same direction for the concealing area at the time of enclosure and prints them on the recording paper.

An image forming method of the present disclosure is an image forming method performed by an image forming apparatus that prints print data on a recording paper. The concealing area that includes a concealing character string in the print data is specified. The character attribute of the concealing character string is discriminated. The see-through preventing area where shape and a size are the same with the concealing area is set. Also, a see-through preventive image, where multiple characters for the discriminated character attribute, is generated at random, and two or more generated characters are arranged at the random position in the see-through preventing area, respectively, is generated. The print data for see-through preventing that is arranged the see-through preventive image at a position piled up by the same direction for the concealing area at the time of enclosure are generated and prints on the recording paper.

BRIEF DESCRIPTION OF THE DRAWINGS

FIG. 5B is an explanatory view explaining superposition of the concealing area and see-through preventive image specified by the control part shown in FIG. 2;

FIG. 5C is an explanatory view explaining superposition of the concealing area and see-through preventive image specified by the control part shown in FIG. 2;

DETAILED DESCRIPTION

Figure 1:
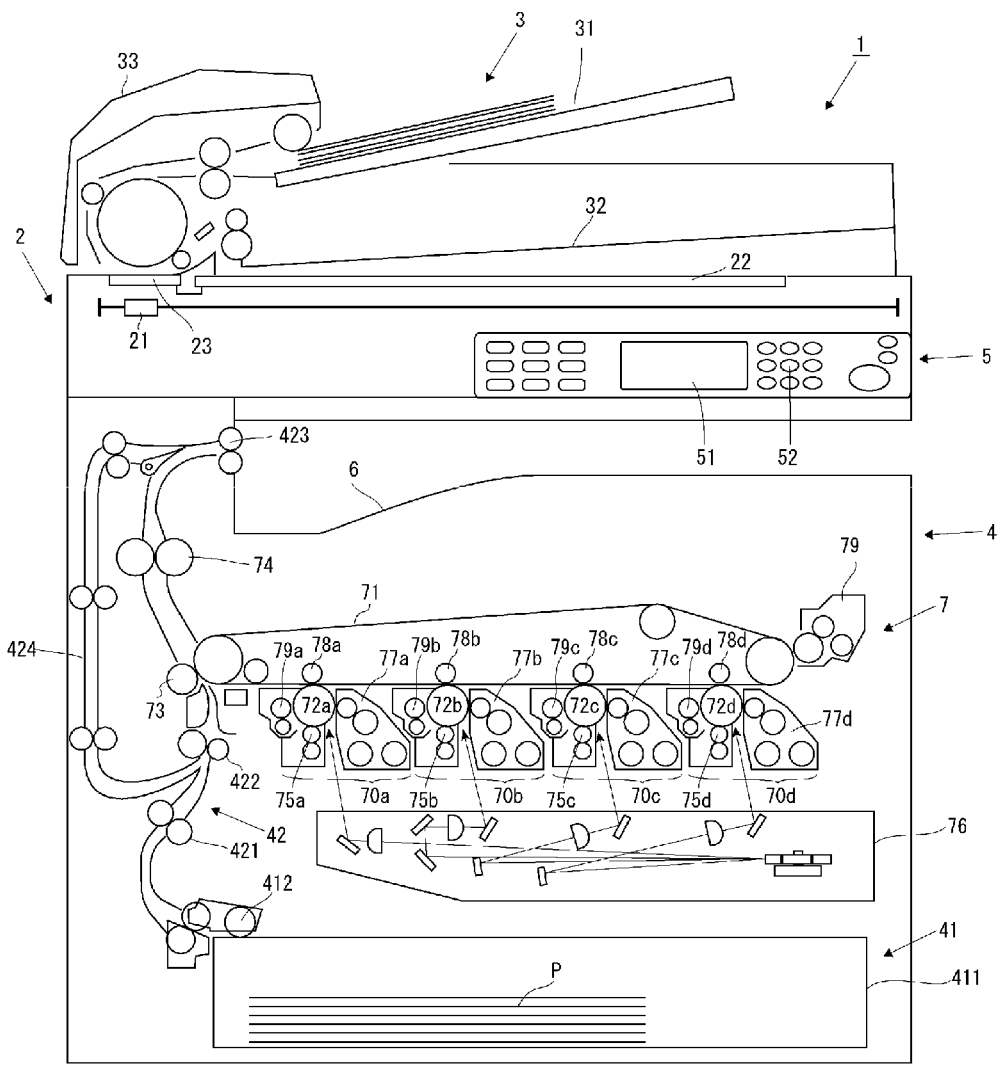
FIG. 1 is an outline schematic cross section illustrating an internal configuration of the embodiment of the image forming apparatus according to the present disclosure.

Next, the embodiment of the present disclosure is explained in detail with reference to drawings. Image forming apparatus 1 in the present embodiment is a copying machine, for example. As refer to FIG. 1, image forming apparatus 1 includes manuscript reading part 2, manuscript feeding part 3, body part 4, and operation part 5. Manuscript reading part 2 is allocated on the upper part of body part 4. Manuscript feeding part 3 is allocated on the upper part of manuscript reading part 2. Operation part 5 includes a start key, a numeric keypad, LCD, or the like. Operation part 5 is allocated in the front side of image forming apparatus 1.

Although the copying machine is explained in the present embodiment, it cannot be overemphasized that an MFP is included.

In operation part 5, liquid crystal display part 51 and operation key 52 are provided. A user operates operation part 5 and thus inputs instructions. Thereby, a user can setup various kinds of setting in image forming apparatus 1 and makes perform various functions, such as image formation. Liquid crystal display part 51 shows the state of the image forming apparatus 1. Also, liquid crystal display part 51 displays an image formation situation and number of prints. Also, liquid crystal display part 51 can perform various setup as a touch panel. Various setup is function settings, such as double-side printing and tone reversal, a magnification setup, a density setup, or the like. In addition, in operation part 5, as operation key 52, a start button, a stop/clear button, a reset button, or the like, are provided. The start button is a button for instructing to start image formation by a user. The stop/clear button is used in a case of stopping image formation. The reset button is used in a case of making various setup in the image forming apparatus 1 to a default.

Manuscript reading part 2 is provided with scanner 21, platen glass 22, and manuscript reading slit 23. Scanner 21 is configured to an exposure lamp, a CCD (Charge Coupled Device) sensor, or the like. Scanner 21 is configured as movable to a transportation direction of a manuscript by manuscript feeding part 3. Platen glass 22 is a manuscript stand configured with transparent members, such as glass. Manuscript reading slit 23 has a slit formed in an orthogonal orientation of the transportation direction for the manuscript by manuscript feeding part 3.

When reading the manuscript placed on platen glass 22, scanner 21 is moved to the position that faces platen glass 22. Scanner 21 scans the manuscript placed in platen glass 22, reads the manuscript, and obtains image data. Scanner 21 outputs the obtained image data to body part 4 as print data to be printed on recording paper P. Also, when the manuscript conveyed by manuscript feeding part 3 is read, scanner 21 is moved to the position that faces manuscript reading slit 23. Scanner 21 reads the manuscript via manuscript reading slit 23 synchronizing with the conveying action of the manuscript by manuscript feeding part 3. Thereby, scanner 21 obtains the image data. Scanner 21 outputs the obtained image data to body part 4 as print data to be printed on recording paper P.

Manuscript feeding part 3 is provided with manuscript mounting part 31, manuscript discharge part 32, and manuscript transport mechanism 33. The manuscript placed on manuscript mounting part 31 is fed out one sheet at a time in order by manuscript transport mechanism 33. The manuscript is conveyed in the position that faces manuscript reading slit 23. Then, a manuscript is discharged to manuscript discharge part 32. Manuscript feeding part 3 is configured as retractable. The upper surface of platen glass 22 can be opened 3 up widely by lifting manuscript feeding part.

Body part 4 is provided with printing part 7 to print on recording paper P. Also, body part 4 is provided with recording paper feeding part 41 and recording paper conveyance part 42. Recording paper feeding part 41 is provided with a plurality of sheet paper cassettes 411 and feed roller 412, for example. Sheet paper cassette 411 contains recording paper P. Feed roller 412 feeds out one sheet of recording paper P at a time to recording paper conveyance part 42 from sheet paper cassette 411. Recording paper conveyance part 42 includes conveying roller 421, registration roller 422, ejection roller 423, and paper invert carrying path 424. Conveying roller 421 supplies recording paper P fed out from recording paper feeding part 41 to printing part 7. Registration roller 422 controls supply timing of recording paper P to printing part 7. Ejection roller 423 discharges recording paper P that is record by printing part 7 on in-body tray 6. Paper invert carrying path 424 is a carrying path for performing double-side printing. When double-side printing is performed, firstly, it prints on single side by printing part 7 for recording paper P fed out from recording paper feeding part 41. Then, recording paper P is conveyed to the position of ejection roller 423. Then, before recording paper P is discharged by in-body tray 6, inverse rotation of the ejection roller 423 is performed, and recording paper P is conveyed to paper invert carrying path 424. Recording paper P conveyed in paper invert carrying path 424 is conveyed by printing part 7 once more with sides being reversed. Then, it is printed in a side opposite to the side printed beforehand. Thereby, as for recording paper P, double-side printing is performed. Then, recording paper P is discharged to in-body tray 6.

Four image formation parts 70a, 70b, 70c, and 70d are allocated in printing part 7. Respectively, they correspond to the image for different 4 colors, which are yellow, cyan, magenta, and black. Also, intermediate transfer belt 71 is adjoined and provided in four image formation parts 70a, 70b, 70c, and 70d. In four image formation parts 70a, 70b, 70c, and 70d, photo conductor drums 72a, 72b, 72c, and 72d that support a toner image that is a visible image of each color are allocated, respectively. The toner images formed on photo conductor drums 72a, 72b, and 72c and 72d are sequentially transferred on intermediate transfer belt 71. Intermediate transfer belt 71 moves contacting photo conductor drums 72a, 72b, 72c, and 72d. The toner image sequentially transferred on intermediate transfer belt 71 is transferred at once on recording paper P in secondary transfer roller 73. Recording paper P is supplied from recording paper feeding part 41. The toner image transferred on recording paper P is fixed on recording paper P by fixing device 74.

Photo conductor drums 72a, 72b, 72c, and 72d are allocated in four image formation parts 70a, 70b, 70c, and 70d, respectively, with allowing free rotation. In circumference of photo conductor drums 72a, 72b, 72c, and 72d, electrification units 75a, 75b, 75c, and 75d, exposure unit 76, developing units 77a, 77b, 77c, and 77d, primary transfer rollers 78a, 78b, 78c, and 78d, and cleaning devices 79a, 79b, 79c, and 79d are provided. Electrification units 75a, 75b, 75c, and 75d electrify photo conductor drums 72a, 72b, 72c, and 72d, respectively. Exposure unit 76 exposes photo conductor drums 72a, 72b, 72c, and 72d, and forms an electrostatic latent image. Developing units 77a, 77b, 77c, and 77d make a toner image form on photo conductor drums 72a, 72b, and 72c and 72d, respectively. Primary transfer rollers 78a, 78b, 78c, and 78d make intermediate transfer belt 71 transfer the toner image on photo conductor drums 72a, 72b, and 72c and 72d, respectively. Cleaning devices 79a, 79b, 79c, and 79d remove the developing powder (toner) remained on photo conductor drums 72a, 72b, and 72c and 72d.

In image formation operation, at first, the surfaces of photo conductor drums 72a, 72b, 72c, and 72d are electrified uniformly by electrification units 75a, 75b, 75c, and 75d. Then, exposure unit 76 performs light irradiation corresponding to print data. Thereby, the electrostatic latent image corresponding to print data is made to form on photo conductor drums 72a, 72b, and 72c and 72d. Developing units 77a, 77b, 77c, and 77d are provided with developing rollers placed opposite to photo conductor drums 72*a*, 72*b*, 72*c*, and 72*d*. Developing units 77*a*, 77*b*, 77*c*, and 77*d* supply the toner of each color of yellow, cyan, magenta, and black on photo conductor drums 72*a*, 72*b*, and 72*c* and 72*d*, respectively, by developing rollers, and it makes them adhere, electrostatically. Thereby, the toner image corresponding to the electrostatic latent image is formed. Next, specified transfer voltage is given to primary transfer rollers 78*a*, 78*b*, 78*c*, and 78*d*. Thereby, a toner image of yellow, cyan, magenta, and black, on photo conductor drums 72*a*, 72*b*, and 72*c* and 72*d*, respectively, is performed primary transfer on intermediate transfer belt 71 with specified timing. Then, a full color toner image is formed on intermediate transfer belt 71. Then, the toner that remained on the surface of photo conductor drums 72*a* 72*b*, 72*c*, and 72*d* is removed by cleaning devices 79*a*, 79*b*, 79*c*, and 79*d*. It is for in preparation for the formation of a new electrostatic latent image performed succeeding.

The sheet made of dielectric resin is used for intermediate transfer belt 71. For intermediate transfer belt 71, a belt piled up the both ends of the sheet are mutually-joined and made into endless shape is used. Also, intermediate transfer belt 71 is used a belt having no joint (seamless.) Intermediate transfer belt 71 makes the formed toner image reach a nip part with secondary transfer roller 73. This is performed with timing that recording paper P is conveyed at secondary transfer roller 73 and the nip part of intermediate transfer belt 71. Thereby, intermediate transfer belt 71 makes the full color image secondary transfer on recording paper P. In addition, intermediate transfer belt 71 and secondary transfer roller 73, rotate with the same linear velocity as photo conductor drums 72*a*, 72*b*, 72*c*, and 72*d*. Also, in view of image formation parts 70*a*, 70*b*, 70*c*, and 70*d*, cleaning device 79 is arranged at the upstream of the movement direction of intermediate transfer belt 71. Cleaning device 79 removes the toner remaining on the surface of intermediate transfer belt 71.

Figure 2:
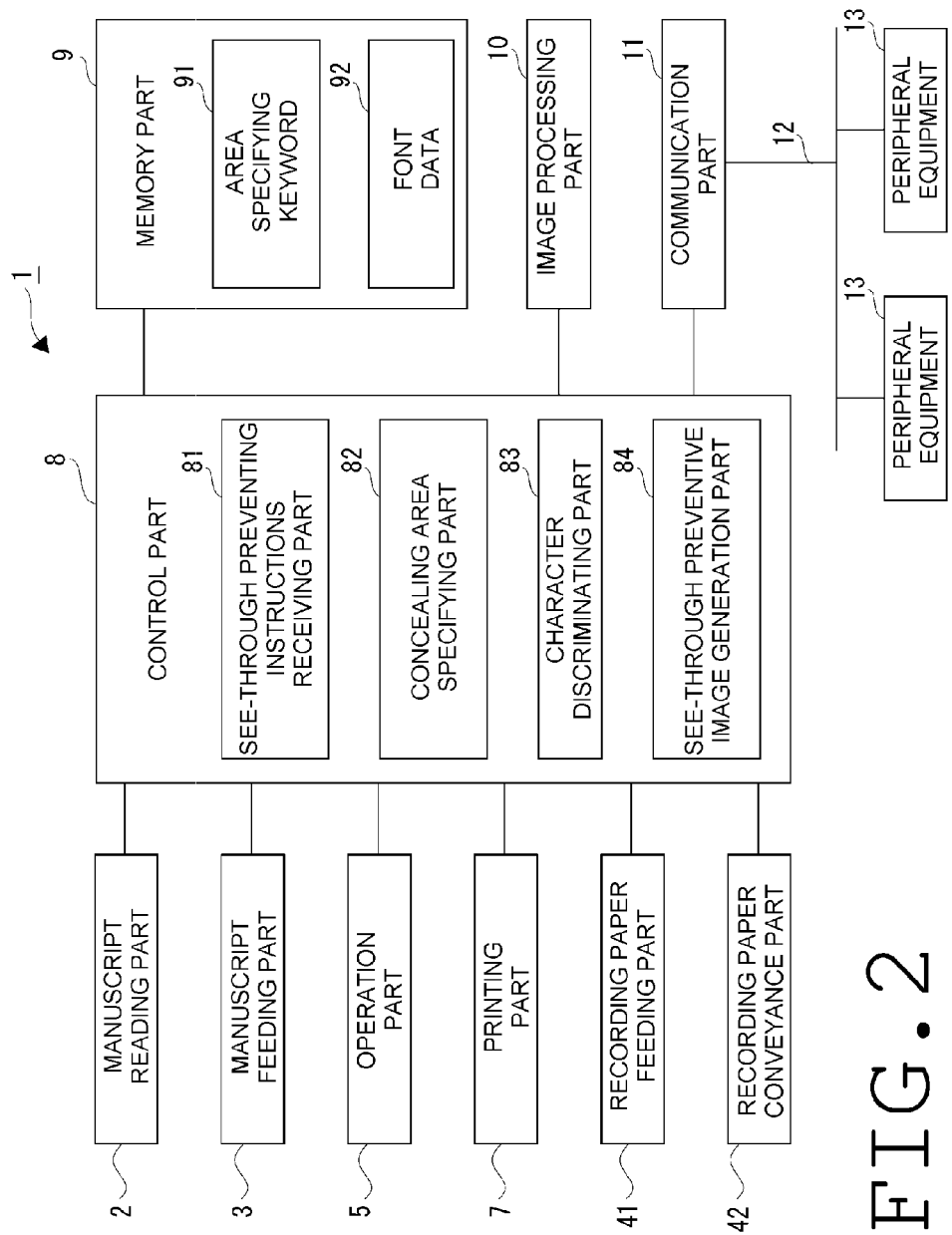
FIG. 2 is a block diagram illustrating a schematic structure in the image forming apparatus shown in FIG. 1.

The block diagram illustrating the schematic structure of image forming apparatus 1 is shown in FIG. 2. Abovementioned manuscript reading part 2, manuscript feeding part 3, operation part 5, printing part 7, recording paper feeding part 41, and recording paper conveyance part 42 are connected to control part 8. Each part is operation controlled by control part 8. Also, memory part 9, image processing part 10, and communication part 11 are connected with control part 8.

Communication part 11 has function to receive document data from peripheral equipment 13, such as a personal computer, via network 12.

Memory part 9 is a non-transitory recording medium. In memory part 9, image data and document data, which are print data, are memorized. Image data is obtained by reading the manuscript by manuscript reading part 2. Document data is received from peripheral equipment 13. Also, in memory part 9, area specifying keyword 91 and font data 92 are memorized. Area specifying keyword 91 is a keyword for specifying a see-through preventing area. Font data 92 is font data for generating a see-through preventive image.

Area specifying keyword 91 is a keyword for specifying a concealing area for see-through preventing. For example, character strings about personal information, such as a "name," "namae," "telephone number", and "tel.," are memorized in memory part 9 as area specifying keyword 91. In addition, it may be memorized new character string as area specifying keyword 91 by a user. Also, a character string used for specifying the concealing area can be configured as selectable from area specifying keyword 91.

In memory part 9, two or more kinds of fonts are memorized as font data 92. Also, a new font as font data 92 can be memorized in memory part 9.

Image processing part 10 has a function that forms the image data for printing based on the document data received from peripheral equipment 13. Also, image processing part 10 performs specified image processing for image data, which are the formed image data and the image data obtained by reading a manuscript by manuscript reading part 2. Image processing part 10 performs a scaling process, an image improvement process, such as density control and gradation adjustment, or the like, for example.

Control part 8 is an information processing part, such as a microcomputer provided with a non-transitory recording medium. In the recording medium, a control program for operation-controlling image forming apparatus 1 is memorized. Control part 8 reads the control program memorized in the recording medium and expands the control program. Thereby, control part 8 controls a whole device corresponding to the specified instructions information inputted from operation part 5.

Also, control part 8 functions as see-through preventing instructions receiving part 81. Control part 8 receives a setup of see-through preventing mode based on the indicating input from operation part 5 by a user. See-through preventing mode is a mode that, when printing document data and the image data, which are the print data, on recording paper P, prints a see-through preventive image. The see-through preventive image is an image for preventing the see-through of secrecy object information, such as personal information included in the document data or image data to print. When secrecy object information is present in the document data and the image data to print, the user sets to the see-through preventing mode and performs printing instructions.

Further, control part 8 functions as concealing area specifying part 82 that specifies a concealing area in which the secrecy object information is included. In case of printing based on the document data, concealing area specifying part 82 analyzes document data. Thereby, concealing area specifying part 82 searches area specifying keyword 91 included in the document data. When a specific concealing character string is present around area specifying keyword 91 that concealing area specifying part 82 is searched, concealing area specifying part 82 specifies the area that includes the concealing character string as a concealing area. This "around area" is right side, bottom, or the like. In addition, when a plurality of area specifying keywords 91 are included in document data and a specific concealing character string is present around respective area specifying keyword 91, a plurality of concealing areas are specified. Control part 8 is provided with an OCR function. When performing copy and printing based on the image data read by manuscript reading part 2, character recognition is performed by the OCR function. After that, control part 8 functions as concealing area specifying part 82 and specifies a concealing area.

Figure 3:
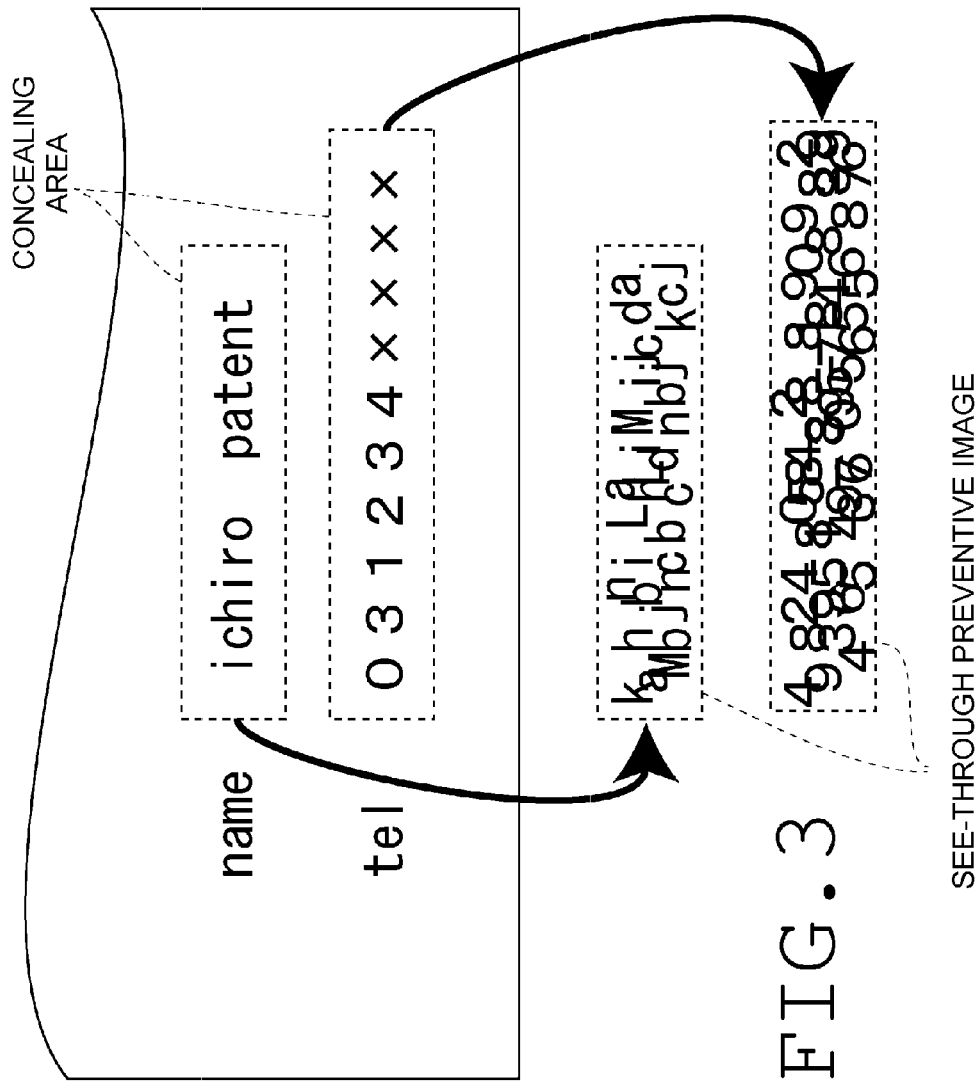
FIG. 3 is a figure illustrating an example of a see-through preventive image generated by the control part shown in FIG. 2.

The concealing character string serving as the object that specifies a concealing area is set up each area specifying keyword 91. For example, when area specifying keyword 91 is "name", the alphabet string is set up as a concealing character string. As illustrated in FIG. 3, when "name" is included in the document data, it is specified the area including the alphabet string, which is present around "name," as the concealing area. Also, when area specifying keyword 91 is "tel.", the digit string is set up as the concealing character string. As shown in FIG. 3, when "tel."

is included in the document data, it is specified the area including the digit string, which is present around "tel.," as the concealing area.

In addition, concealing area specifying part 82 may be specified the concealing area by inputting indication of an area by operation part 5. Also, it may be configured that the concealing area specified by concealing area specifying part 82 is selectable by operation parts 5.

Control part 8 functions as character discriminating part 83 that discriminates the character attribute of the concealing character string. Character discriminating part 83 discriminates character systems, such as a Chinese character, a Hiragana, a Katakana, a Latin alphabet, and Arabic numerals, as the character attribute of the concealing character string. Also, character discriminating part 83 discriminates a font, a character type, displayed character size, and a character color. Character types are full width, half width, or the like. In addition, distinction of the font is discriminated from font data 92 memorized in memory part 9.

Control part 8 functions as see-through preventive image generation part 84 that generates the see-through preventive image. At first, see-through preventive image generation part 84 respectively-sets up the see-through preventing area where the shape and the size are the same with the concealing area specified by concealing area specifying part 82. Then, see-through preventive image generation part 84 generates multiple characters of the character attribute discriminated by character discriminating part 83 at random for each concealing area. Thereby, as shown in FIG. 3, the see-through preventive image arranged two or more generated characters at the random position in the corresponding see-through preventing area, respectively, is generated. The number of the character arranged in the see-through preventing area can be set as a number per unit area. That is, it can be determined corresponding to the size of the see-through preventive area. Also, a printing rate of the see-through preventive area may be set up. That is, characters are generated and arranged until it reaches the set-up printing rate. In this case, in spite of the character attribute discriminated by character discriminating part 83, the printing rate of the see-through preventing area can be almost standardized.

Figure 4:
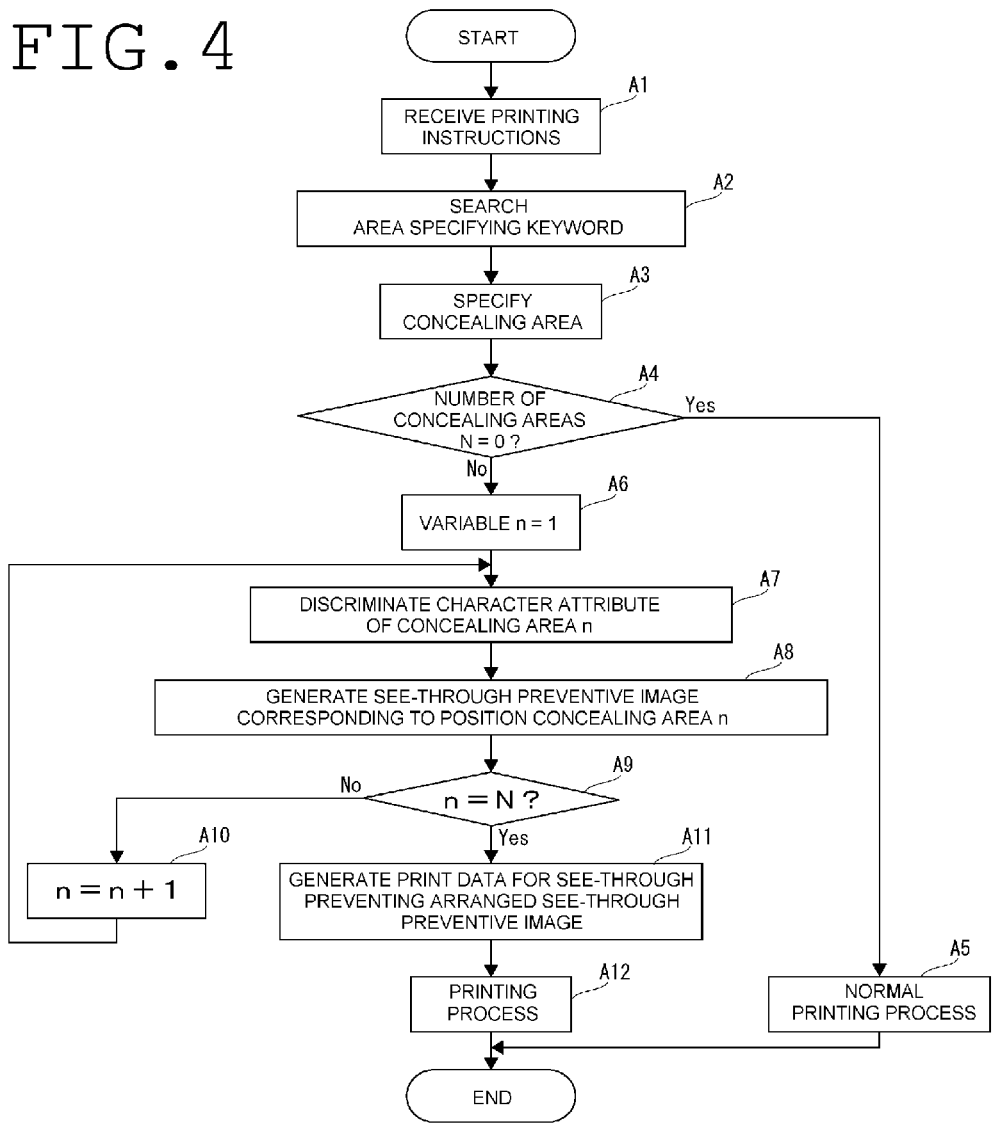
FIG. 4 is a flow chart for explaining a print operation in a see-through preventing mode in the image forming apparatus shown in FIG. 1.

Then, a print operation in the see-through preventing mode is explained in detail with reference to FIG. 4 and FIG. 5. Control part 8 receives printing instructions in the see-through preventing mode (Step A1). Then, control part 8 functions as concealing area specifying part 82. Control part 8 searches area specifying keyword 91 included in document data by analyzing document data (Step A2). Control part 8, when a specific concealing character string is present around searched area specifying keyword 91, specifies the area including this concealing character string as a concealing area (step A3). This "around searched area" is right side, bottom side, or the like. In addition, if the printing instruction received in Step A1 is the printing instruction or copy instruction of image data, which is read by manuscript reading part 2, after performing character recognition by an OCR function, control part 8 specifies concealing area in step A3.

Next, control part 8 determines whether or not N, which is the number of concealing areas, is 0 (step A4). That is, control part 8 determines whether or not the concealing area is specified in step A3. Then, if N, which is the number of concealing areas, is 0 in step A4, control part 8 performs a normal printing process (step A5). Then, control part 8 ends the print operation in see-through preventing mode.

If the number of concealing areas is not 0 in step A4, control part 8 sets 1 to variable n (Step A6). This is a case where the concealing area is specified in step A3. Then, control part 8 functions as character discriminating part 83. Control part 8 discriminates the character attribute of the concealing character string included in the n-th concealing area (Step A7). Then, control part 8 functions as see-through preventive image generation part 84. Control part 8 generates the see-through preventive image corresponding to the n-th concealing area (Step A8).

Next, control part 8 determines whether or not the variable n is reached N, which is the number of concealing areas (Step A9). If variable n is not reached N, which is the number of concealing areas, control part 8 increments variable n (Step A10). Then, control part 8 returns to Step A7. Thereby, the see-through preventive image is generated for each concealing area specified in step A3. In addition, it may be configured that information of one surface to print is searched and analyzed, and then, the see-through preventive image of the printing surface is generated.

Figure 5A:
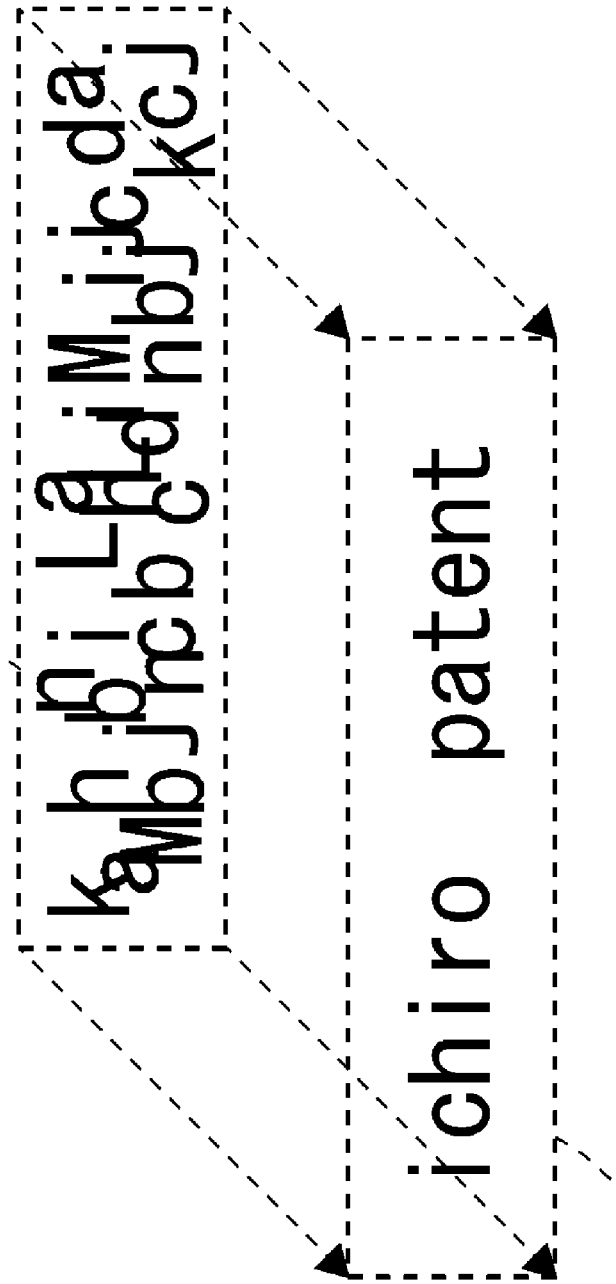
FIG. 5A is an explanatory view explaining superposition of a concealing area and see-through preventive image specified by the control part shown in FIG. 2.

If variable n reaches N, which is the number of concealing areas, in Step A9, control part 8 generates the print data for see-through preventing, which is arranged the see-through preventive image generated in Step A8 (Step A11). Control part 8 arranges the see-through preventive image in the position piled up by the same direction for the concealing area at the time of enclosure to an envelope, or the like. Control part 8 performs the printing process based on the generated print data for see-through preventing (Step A12). Thereby, control part 8 ends the print operation in see-through preventing mode. An arrangement of the see-through preventive image is configured to allows setting up suitably by the user. For example, FIG. 5A shows the case that arranges a see-through preventive image at the back surface of a concealing area and piles up the see-through preventive image from the back surface side for the concealing area. In this case, control part 8 generates the print data for see-through preventing for the back surface, which arranges a horizontal-flipped see-through preventive image, and double-side printing is performed. Also, FIG. 5B illustrates a case where arranges a see-through preventive image on the same surface as a concealing area and piles up the see-through preventive image from the front surface side for the concealing area by folding recording paper P. In this case, control part 8 generates the print data for see-through preventing for front surfaces to the print data used in the front surface of recording paper P, and single side printing is performed. In the print data for see-through preventing for front surfaces, a horizontal-flipped or vertical-flipped see-through preventive image is arranged as corresponded to the folding direction.

Figure 5C:
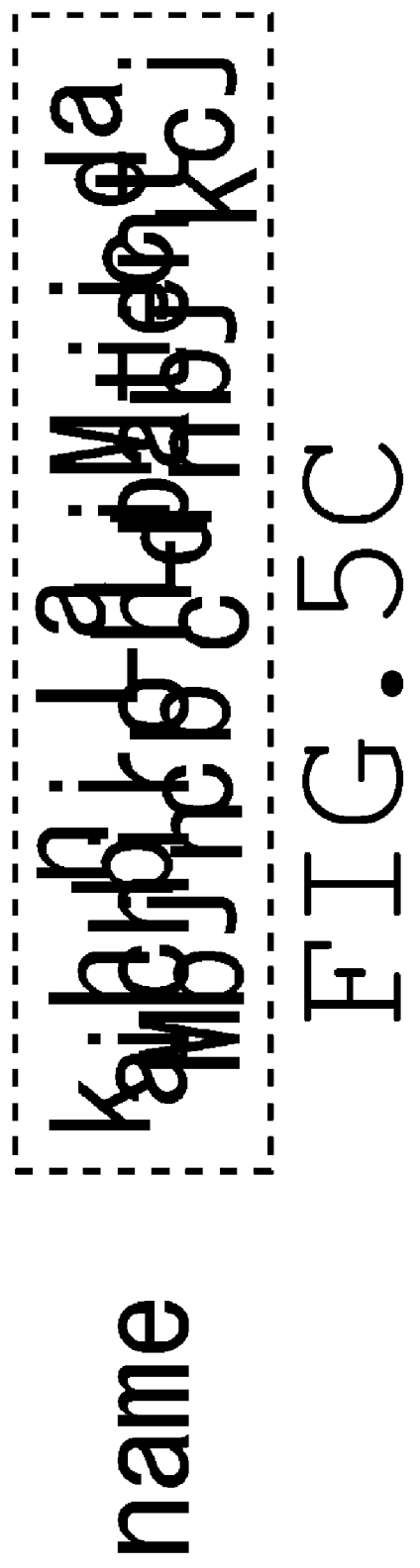

Thereby, even if trying see-through to the concealing character string of the concealing area, as illustrated in FIG. 5C, the see-through preventive image is piled up. That is, the concealing character string is indistinguishable into a plurality of characters that have the same character attribute. Thus, it becomes impossible to recognize the concealing character string in the concealing area.

In addition, in the present embodiment, it is explained that an example that the number of the character attributes of a concealing character string is one. However, in area specifying keyword 91, as a concealing character string, a mixture character string in which the characters having a different character attribute is exist may be set up. For example, if area specifying keyword 91 is a "password", a concealing area including the mixture character string in which an alphabet and a number are exist as a concealing character string is specified. In this case, character discriminating part 83 also discriminates the mixture ratio of each character attribute in the concealing character string. This mixture ratio is a ratio of the alphabet and the number in the mixture character string in this example. Then, see-through preventive image generation part 84 generates a random character having each character attribute in the mixture ratio discriminated by character discriminating part 83 and arranges it at the random position in the see-through preventing area, respectively. Thereby, see-through preventive image generation part 84 generates the see-through preventive image. As a result, even if the concealing character string is the mixture character string in which the character having a different character attribute is exist, a see-through can be prevented, certainly. Also, character discriminating part 83 may discriminate, as the mixture ratio of the character attribute, not only a character system, but a font, a character type, such as full width and half width, character size, and a mixture ratio of a character color. Character discriminating part 83 may generate a character of each character attribute at random in the discriminated mixture ratio and arranges at the random position in the see-through preventing area, respectively. Thereby, even if different fonts, different character types, such as full width and half width, and different character sizes, and a different character colors are exist in the concealing character string, a see-through can be prevented, certainly.

Also, in a case of copy printing, to the character color of the read concealing character string, it may generate a see-through preventive image in a plurality of colors from which color distance is a fixed range. Thereby, even if the colors of the read image differ delicately, the effect of preventing a see-through is obtained.

OTHER EMBODIMENTS

Figure 6:
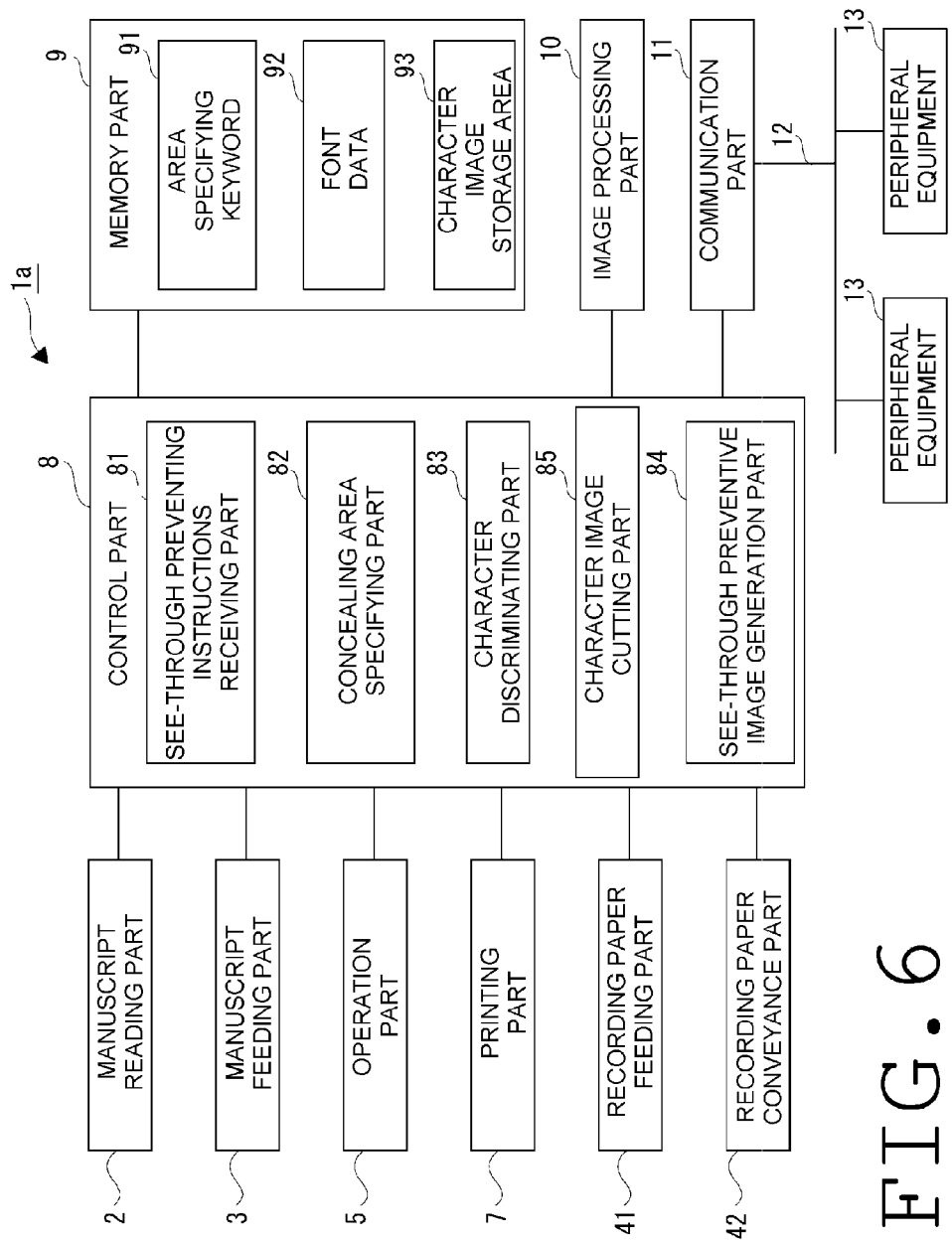
FIG. 6 is a block diagram illustrating a schematic structure of other embodiments in the image forming apparatus according to the present disclosure.

When FIG. 6 is referred to, as for image forming apparatus 1a in another embodiment, control part 8 function as character image cutting part 85. Character image cutting part 85 cuts down a character image for every single character from the image data (print data) read by manuscript reading part 2. Also, character image storage area 93 is secured in memory part 9. Character image storage area 93 stores the character image cut down by character image cutting part 85. Control part 8 generates a see-through preventive image by using the character image stored in character image storage area 93.

Figure 7:
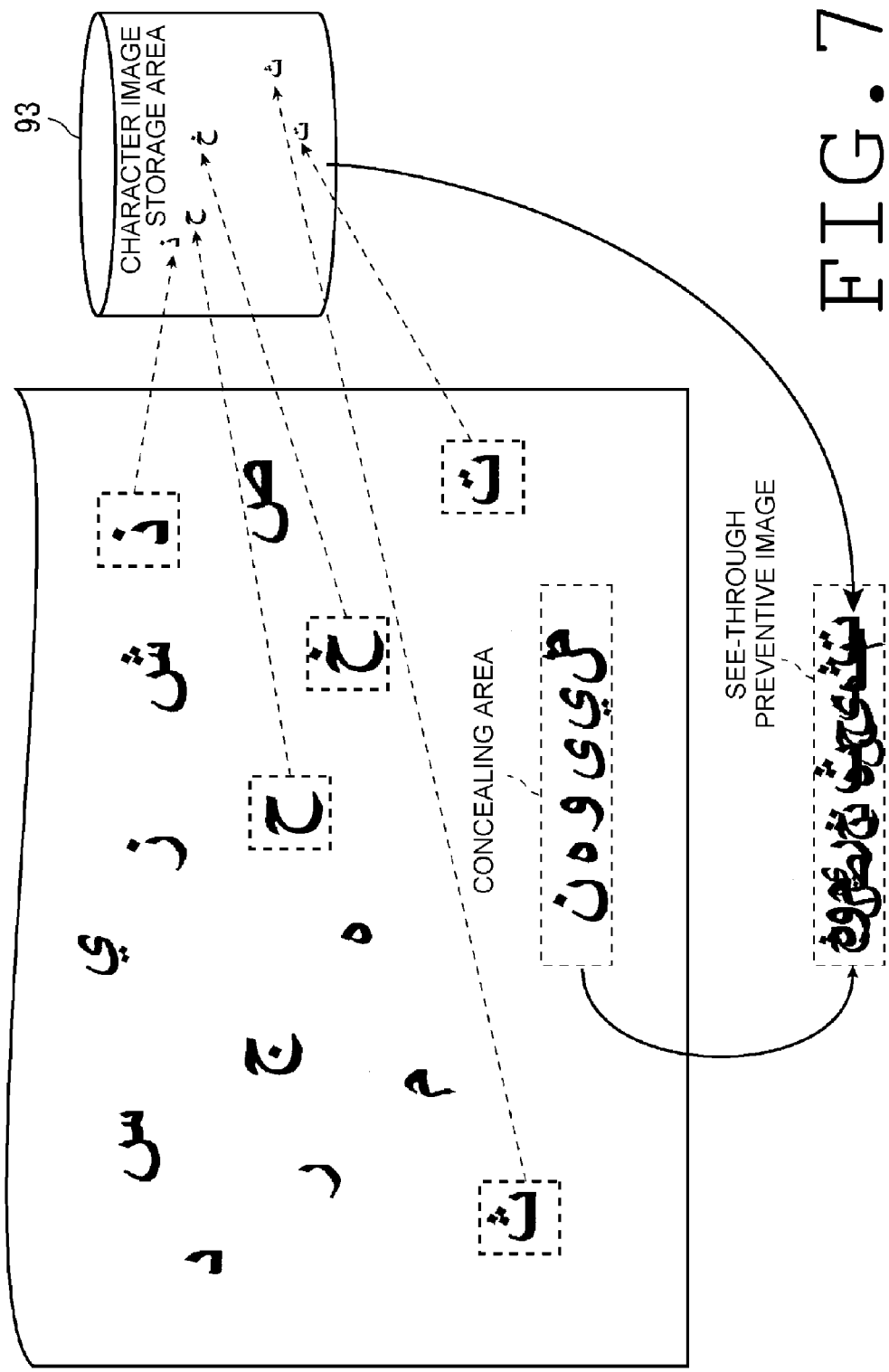
FIG. 7 is an explanatory view to explain logging of a character image and generation operation of a see-through preventive image by the control part shown in FIG. 2.

Then, print operation when an OCR function cannot perform character recognition in see-through preventing mode is explained in detail with reference to FIG. 7.

In image forming apparatus 1a, control part 8 functions as concealing area specifying part 82. Thereby, control part 8 have specified the concealing area based on an input from operation part 5. Then, control part 8 receives the printing instructions that instruct copy printing in see-through preventing mode. Control part 8 functions as character image cutting part 85 if character recognition is not available by an OCR function. As shown in FIG. 7, Character image cutting part 85 cuts down a character image for every single character from the image data read by manuscript reading part 2. Control part 8 stores the cut down character to character image storage area 93 in memory part 9. In addition, the number to cut down character images may be set up, previously. However, it is preferred for the number that cuts down character images to be set as corresponded to an amount of the concealing area. That is, it is preferred to configure that a lot of character images are cut down so that the size of a concealing area is large. Thereby, the character image not-needed will not cut down, and the cutting down operations of character images can be carried out, efficiently.

Then, control part 8 functions as see-through preventive image generation part 84. As shown in FIG. 7, Control part 8 generates the see-through preventive image arranged the character image, which is stored in character image storage area 93, at the random position in a see-through preventing area, respectively.

Hereinafter, as like the first embodiment, the print data for see-through preventing are generated, and a printing process is performed. That is, in the print data for see-through preventing, the see-through preventive image is arranged at the position piled up to the same direction for the concealing area. Thereby, even if character recognition cannot be performed by an OCR function and the concealing character string in the concealing area cannot be discriminated, it becomes possible to generate the see-through preventive image that can keep the concealing character string in the concealing area secret, certainly.

In addition, the character images stored in character image storage area 93 may be managed per page, and it can be reused them. In this case, it is preferred to be configured that the using character image stored in character image storage area 93 for the see-through preventive image is selectable by a user.

As explained above, according to the present embodiment, image forming apparatus 1 prints print data on recording paper P. Concealing area specifying part 82 specifies a concealing area that includes a concealing character string in the print data. Character discriminating part 83 discriminates a character attribute of the concealing character string. See-through preventive image generation part 84 sets up a see-through preventing area where a shape and a size are the same as the concealing area. Then, see-through preventive image generation part 84 randomly generates multiple characters having the character attribute discriminated by character discriminating part 83. Thereby, see-through preventive image generation part 84 generates a see-through preventive image arranged two or more generated characters at the random position in the see-through preventing area, respectively. Then, the print data for see-through preventing arranged the see-through preventive image in the position piled up to the same direction for the concealing area at the time of enclosure are generated and is printed on recording paper P. Because of this configuration, the see-through preventive image configures to have characters of the same character attribute as a concealing character string. Therefore, even if it makes the printing rate of the see-through preventive image is lower, the concealing character string in the concealing area can be kept secret, certainly. Thereby, even if the recording paper P enclosed with the envelope, or the like, is seen through by exposing light from the reverse side, the secrecy character cannot be discriminated. Accordingly, secrets, such as personal information, can be kept.

Further, according to the present embodiment, character discriminating part 83 discriminates a character system as a character attribute of the concealing character string. Also, see-through preventive image generation part 84 randomly generates multiple characters having the same character system in the concealing character string. By this configuration, a see-through preventive image can consist of characters having the same character system as the concealing character string. Accordingly, the concealing character string in the concealing area can be more certainly kept secret.

Furthermore, according to the present embodiment, it is provided memory part 9 where two or more kinds of fonts are memorized as font data 92. Then, character discriminating part 83 discriminates distinction of the font, which is the character attribute in the concealing character string, in font data 92. Since having this configuration, the see-through preventive image can consist of characters in the same font as the concealing character string. Accordingly, the concealing character string of a concealing area can be more certainly kept secret.

Further, according to the present embodiment, character discriminating part 83, if the concealing character string is the mixture character string in which the character having a different character attribute is exist, also discriminates the mixture ratio of each character attribute. Then, see-through preventive image generation part 84 randomly generates the character of each character attribute in the mixture ratio discriminated by character discriminating part 83. By this configuration, even if the concealing character string is the mixture character string in which the character having the different character attributes is exist, a see-through can be prevented certainly.

Also, according to the present embodiment, image forming apparatus 1*a* prints print data on recording paper P. Concealing area specifying part 82 specifies a concealing area in print data. Character image cutting part 85 cuts down a character image for every single character from print data. Memory part 9, which character image storage area 93 is reserved, stores the character image cut down by character image cutting part 85. See-through preventive image generation part 84 sets up the see-through preventing area where shape and a size are the same as the concealing area. Also, see-through preventive image generation part 84 generates the see-through preventive image arranged the character image stored in character image storage area 93 at the random position in the see-through preventing area, respectively. Then, the print data for see-through preventing arranged the see-through preventive image in the position piled up to the same direction for the concealing area at the time of enclosure are generated, and it is printed on recording paper P. By this configuration, even if it cannot be performed character recognition by OCR function and the concealing character string in the concealing area cannot be discriminated, it becomes possible to generate a see-through preventive image that concealing character string of the concealing area can be certainly kept secret.

As being summarized, in a typical case, the see-through preventing pattern formed in a combination of basic pattern instead of totally-black is printed as a see-through preventive image. Therefore, the printing rate of the see-through preventive image is able to be lower, and toner consumption is able to be cut down. However, the information of the concealing area cannot be completely kept secret. That is, in the typical case, if the concealing area is a character area, by using a basic pattern that has 50% printing rate, a checkered see-through preventing pattern is formed as the see-through preventive image. However, when being seen through in this state, since a character against for a checkered pattern is printed, a character cannot be completely kept secret. As compared with this, in the image forming apparatus in the present disclosure, the see-through preventive image is configured a character having the same character attribute as a concealing character string. Therefore, the effect is produced that the concealing character string of the concealing area can be certainly kept secret even if it makes low the printing rate for the see-through preventive image.

In addition, the present disclosure is not limited to each above-mentioned embodiment, and it is clear that each embodiment may be suitably changed within the limits of the technological conception in the present disclosure. Also, a number, a position, shape, or the like, for the above-mentioned members, are not limited to the above-mentioned embodiment, and when carrying out the present disclosure, it can be made a preferred number, a position, shape, or the like. In addition, in each figure, identical numbers are given to the identical configurational element.

What is claimed is:

1. An image forming apparatus to print a printing data on a recording paper, comprising:
   a concealing area specifying part that specifies a concealing area including a concealing character string in the printing data;
   a character discriminating part that discriminates a character attribute of the concealing character string;
   a see-through preventive image generation part that sets a see-through preventing area where a shape and a size are same with a concealing area, generates multiple characters having the character attribute discriminated by the character discriminating part are at random, and generates a see-through preventive image respectively-arranging two or more generated characters at a random position in the see-through preventing area; and
   a printing part that generates the printing data for see-through preventing where the see-through preventive image is arranged at a position piled up by a same direction for the concealing area at the time of enclosure and prints on the recording paper;
   wherein the character discriminating part, when the concealing character string is a mixture character string where characters having mixed a different character attribute, further discriminates a mixture ratio of each character attribute;
   the see-through preventive image generation part generates a character for each character attribute at random in the mixture ratio discriminated by the character discriminating part; and
   the character attribute includes a character system, a font, a character type including full width and half width, a character size, or a character color.

2. The image forming apparatus according to claim 1, wherein the character discriminating part discriminates the character system as the character attribute of the concealing character string, and
   the see-through preventive image generation part generates the multiple characters for same character system as the concealing character string at random.

3. The image forming apparatus according to claim 1, further comprising:
   a memory part that memorizes two or more kinds of fonts as font data; and
   the character discriminating part discriminates distinction of the font being the character attribute of the concealing character string in the font data.

4. An image forming method performed by an image forming apparatus to print a printing data on a recording paper, comprising the steps of:
   specifying, by a controller part, concealing area that includes a concealing character string in the print data;
   discriminating, by the controller part, character attribute of the concealing character string;
   setting, by the controller part, a see-through preventing area where a shape and a size are same with the concealing area;

generating, by the controller part, multiple characters having discriminated character attribute at random;

generating, by the controller part, a see-through preventive image respectively-arranging two or more generated characters at a random position in the see-through preventing area; generating the printing data for see-through preventing where the see-through preventive image is arranged at a position piled up by a same direction for the concealing area at the time of enclosure; and printing, by a printing part, the printing data on the recording paper;

wherein when the concealing character string is a mixture character string where characters having mixed a different character attribute, a mixture ratio of each character attribute is discriminated and a character for each character attribute is generated at random in the discriminated mixture ratio; and the character attribute includes a character system, a font, a character type including full width and half width, a character size, or a character color.

* * * * *